United States Patent
Renner (10) Patent No.: US 10,857,614 B2
(45) Date of Patent: Dec. 8, 2020

(54) SYSTEM AND METHOD FOR PREVENTING HIGH VOLTAGE ON A LOW VOLTAGE OUTPUT IN A WELDING-TYPE SYSTEM

(71) Applicant: Illinois Tool Works Inc., Glenview, IL (US)

(72) Inventor: Ross Renner, Black Creek, WI (US)

(73) Assignee: Illinois Tool Works Inc., Glenview, IL (US)

( * ) Notice: Subject to any disclaimer, the term of this patent is extended or adjusted under 35 U.S.C. 154(b) by 396 days.

(21) Appl. No.: 15/833,445

(22) Filed: Dec. 6, 2017

(65) Prior Publication Data

US 2019/0168332 A1    Jun. 6, 2019

(51) Int. Cl.
*B23K 9/10*    (2006.01)
*H02J 7/00*    (2006.01)
*B23K 9/32*    (2006.01)
*H02J 7/14*    (2006.01)

(52) U.S. Cl.
CPC .......... *B23K 9/1075* (2013.01); *B23K 9/1006* (2013.01); *B23K 9/1043* (2013.01); *B23K 9/32* (2013.01); *H02J 7/0068* (2013.01); *H02J 7/1415* (2013.01); *H02J 7/1438* (2013.01)

(58) Field of Classification Search
CPC ...... B23K 9/0953; B23K 9/10; B23K 9/1006; B23K 9/1012; B23K 9/1031; B23K 9/1043; B23K 9/32; G05F 1/00; H02J 7/14
USPC .............................. 219/130.21; 307/116–131
See application file for complete search history.

(56) References Cited

U.S. PATENT DOCUMENTS

| | | | | |
|---|---|---|---|---|
| 4,943,699 A | * | 7/1990 | Thommes ............ | B23K 9/1006 219/121.54 |
| 5,250,786 A | * | 10/1993 | Kikuchi ............... | B23K 9/1056 219/130.32 |
| 6,153,855 A | * | 11/2000 | Renner ............... | B23K 9/1006 219/130.21 |
| 6,818,860 B1 | * | 11/2004 | Stava .................. | B23K 9/1006 219/130.1 |
| 6,982,398 B2 | * | 1/2006 | Albrecht ............. | B23K 9/1006 219/133 |
| 8,759,714 B2 | * | 6/2014 | Fosbinder ........... | B23K 9/1006 219/130.21 |
| 2015/0255975 A1 | * | 9/2015 | Siciak .................... | B60L 58/21 307/9.1 |

OTHER PUBLICATIONS

"WO2019113154 International Search Report". International Search Report for WO2019113154. WIPO. (Year: 2019).*

* cited by examiner

*Primary Examiner* — David P Angwin
*Assistant Examiner* — Nicholas A Ros
(74) *Attorney, Agent, or Firm* — McAndrews, Held & Malloy, Ltd.

(57) ABSTRACT

Systems and methods for a welding-type power supply to provide both a welding output voltage and a battery charging output voltage. The power supply includes a first contactor associated with a first circuit to provide the welding output voltage, and a second contactor associated with a second circuit to provide the battery charging output voltage. An auxiliary switch is operatively coupled to the second contactor, to prevent the first circuit from closing when the second contactor is closed to prevent transmission of the welding output voltage to the second circuit.

20 Claims, 5 Drawing Sheets

FIG. 2

| Control Process | S1 | W1 | W2 |
|---|---|---|---|
| Battery charge 12V | CLOSE | CLOSE | CLOSE |
| Battery charge 24V | CLOSE | CLOSE | CLOSE |
| WELD | OPEN | OPEN | OPEN |
| | | | |

SYSTEM AND METHOD FOR PREVENTING HIGH VOLTAGE ON A LOW VOLTAGE OUTPUT IN A WELDING-TYPE SYSTEM

BACKGROUND

Welding systems employ welding-type power supplies to perform welding and other operations. Some welding-type power supplies are configured to provide multiple outputs. For example, two or more voltage levels can be output from a single welding-type power supply. A major concern in engineering is ensuring proper operation of powerful machines. In some situations, a high power level can cross to a low power output, damaging t sensitive equipment. This can be caused by an equipment failure, etc. Therefore, introducing features that improve prevents damage to equipment, is desirable.

SUMMARY

Systems and methods are disclosed for preventing high voltage on a low voltage output in a welding-type system. In particular, disclosed example welding-type systems and methods are configured to implement an interlock system, using mechanical means, for preventing welding voltage output (e.g., high voltage) on a battery charge output (e.g., low voltage).

BRIEF DESCRIPTION OF THE DRAWINGS

The figures are not necessarily to scale. Where appropriate, similar or identical reference numbers are used to refer to similar or identical components.

DETAILED DESCRIPTION

In examples disclosed herein, systems and methods for preventing welding voltage on a battery charging voltage output in a welding-type system configured to output multiple voltage levels are described. In particular, a mechanical interlock system is employed to prevent welding voltage output from transmitting to a battery charge output. For example, the system employs a switch (e.g., an auxiliary switch) operatively coupled to a contactor associated with the battery charging voltage output. In examples, the switch is configured to open a portion of the welding circuit, preventing the circuit from closing when the battery charging voltage contactor is closed and battery charging voltage is being output. This arrangement prevents transmission of the welding output voltage from a first circuit (e.g., a high voltage welding circuit) to a second circuit (e.g., a low voltage battery charging circuit), further preventing damage to sensitive equipment.

For instance, an interlock is a mechanism and/or circuit for connecting and/or coordinating the function of different components. An interlock can be used to prevent an operator from harm and/or a machine from damage by preventing one element from changing state due to the state of another element. In the example of a power supply configured to output two voltage levels, an interlock is used to prevent a second voltage from being output while a first voltage is selected.

In some examples, the interlock can employ a mechanical component to manage connection in an electrical system. The interlock can include one or more switches that prevent the first and second voltages from being output simultaneously. Without this safeguard, providing both output voltages at once could output an unacceptably high voltage to a device rated for a lower voltage level. An interlock is thus designed to allow a power supply to output a first or a second voltage only when selected. In particular, the interlock prevents a non-selected circuit from being completed, thereby preventing any current from flowing through the non-selected (i.e. open) circuit.

In some examples, the interlock can close one or more contactors to output power to a selected terminal, and open a portion of the non-selected circuit. For example, a contactor is an electrically controlled switch used for switching an electrical power circuit, often with high current capacity (e.g., suitable for a welding-type operation). A contactor is typically controlled by a circuit, which has a much lower power level than the desired output (e.g., a 24-volt coil electromagnet can control a 220-volt motorswitch).

In some examples, a contactor includes contacts that are the current carrying part of the contactor, such as power contacts, auxiliary contacts, and contact springs, as contactors may be spring loaded to prevent contact welding. A contactor may have a coil input (e.g., driven by either an AC or DC supply depending on the contactor design). The electromagnet or "coil" provides the driving force to close the contacts. The contactor may include an enclosure with a frame housing the contacts and the electromagnet to protect and insulate the contacts and to prevent operators from touching the contacts. A contactor can therefore be controlled by an electrical switch and used for switching a power circuit, similar to a relay but capable of conveying a higher current. The controlling circuit can operate at a power level much lower than the device to be powered.

In examples that employ a single generator (e.g., power supply) to provide multiple output voltages, there is a need to prevent a higher voltage (e.g., welding type voltage/power) from being applied to a low voltage output circuit (e.g., battery charge voltage/power), such as in the event of a fault. A fault can be caused by user error, machine failure, etc. The systems and methods disclosed herein provide an automatic interlock system configured to prevent a high voltage output from being connected to a battery charge system, such as in the event of a fault in a battery charge "disconnecting" device (e.g., W1 of FIGS. 1 and 2).

As stated, a microcontroller or control circuit controls one or more contactors based on a selection of desired operation. If a circuit is open (e.g., broken) at any point (e.g., in response to an interlock), then signals from the microcontroller will not be effective in closing the contactor. Thus, an interlock device can also be found on a main selector switch to control a portion of the battery circuit (e.g., a return, or ground, of the circuit, or any portion interrupting current flow). Thus, the contactor associated with the battery circuit cannot close, regardless of instructions from the controller.

A process selection switch e.g., associated with an operator interface) of the power supply can be configured to physically disconnect the high voltage output before connecting the low voltage output of the power supply. However, conventional process switches operate with some challenges. For example, the process switch can require a large device size relative to the power supply housing. For instance, to accommodate a high power operation, the process switch in conventional systems requires a high current cable to be routed inside the power supply housing, such as from the source of power to the front panel, output terminal, etc. For power supplies that have remote panels, this arrangement adds unnecessary weight and bulk by extending the cabling system to connect the remote panel to the main unit. In stand-alone power supplies, a conventional process switch and associated cabling takes up space inside the unit, increasing the size and weight of the housing.

Alternatively or additionally, a process selector switch can be used. The process switch would be configured to carry high current, and would disconnect the battery when welding is taking place. In disclosed examples, the welding type system avoids use of a conventional, high voltage process switch, Which is replaced with a high current contactor inside the power supply housing. Because of their small size relative to conventional process switches, contactors provide a compact and low weight design. Further, employing the system of connected contactors and switches encompasses a small compact size, due in part to use of contactors instead of a large, high current process switch and cables that would otherwise be required. Therefore, the overall weight is less than other systems.

Moreover, in conventional systems, if a fault occurred and a contactor used to disconnect a battery charge output were to fail and close, the result would be that high voltage could be applied to a battery being charged, which could potentially damage the battery. Advantageously, a mechanical interlock prevents high voltage output to any connected battery without further action. No user intervention is needed to lock out high voltage from the battery that is charging.

Example systems and methods described herein do not rely on microprocessor control for shutting down or preventing high voltage on an attached battery or battery charging circuit. This is due to the simplified controls, using ground connections and mechanical switches, operating in response to relatively low current signals.

A two-contactor system on the battery charge output could be also used, without contactors for the weld system. If one contactor should happen to fail, the other would still open when required, to disconnect the circuit and shut the output off. The battery charge contactors would employ a switch to disconnect when welding is taking place, and therefore not rely on microprocessor control. In some such examples, a switched mode power supply (e.g., inverter) could be used, with a direct output to welding taps.

In disclosed examples, a welding-type power supply configured to supply a welding output voltage and a battery charging output voltage. The power supply includes a first contactor associated with a first circuit to provide the welding output voltage, a second contactor associated with a second circuit to provide the battery charging output voltage; and an auxiliary switch operatively coupled to the second contactor. The auxiliary switch is configured to prevent the first circuit from closing when the second contactor is closed to prevent transmission of the welding output voltage to the second circuit.

In examples, a selector is configured to select between the welding output voltage and the battery charging output voltage.

In some examples, a control circuit controls one or more of the first contactor the second contactor or the auxiliary switch, wherein, in response to selection of the battery charging output voltage, the control circuit is configured to control the second contactor to close and the auxiliary switch to open the first contactor thereby opening the first circuit.

In examples, the selector is mechanically connected to a portion of the second circuit, the portion of the second circuit to open the first circuit when the battery charging output voltage is selected.

In some examples, a portion of the first circuit is configured to open when the second contactor closes in response to a fault condition to prevent welding output voltage being applied from the first circuit to the second circuit.

In examples, a direct current (DC) output receptacle to provide the battery charging output voltage, and a welding output receptacle to provide the welding output voltage. The battery charging output voltage and the welding output voltage provide power to respective receptacles via a common connection at an output rectifier.

In some examples, a generator is configured be driven by an engine, the generator includes a first coil and a second coil, the welding output voltage being generated via the first and the battery charging voltage being generated via the second coil.

In disclosed examples, a welding-type power supply is configured to supply a welding output voltage and a battery charging output voltage. The power supply includes a first circuit to provide the welding output voltage, a second circuit to provide the battery charging output voltage, a first and second contactor associated with the second circuit to provide the battery charging output voltage, and a selector switch operatively coupled to a portion of the second circuit to prevent the second circuit from closing when the first circuit is closed to prevent transmission of the welding output voltage to the second circuit.

In some examples, a switched mode power supply is configured to condition an output from a generator to provide the welding output voltage or the battery charging voltage based on the selection. In examples, a selector switch is configured to transmit commands to the first and second contactors to close the second circuit to provide battery charging output voltage.

In some examples, a first battery coil and a second battery coil are included, with the first and second coils connected to the second circuit, such that selection of the welding output voltage prevents the first battery coil or the second battery coil from closing.

In examples, a control circuit is configured to receive a signal corresponding to a selection from the selector switch; and control an output from the switched mode power supply based on the selection. In some examples, the welding output voltage is higher than the battery charging output voltage.

In disclosed examples, a method is provided for operating a welding-type power supply configured to supply a welding output voltage and a battery charging output voltage. The method includes closing a first and second contactor associated with the battery charge output voltage, the first and second contactor operatively coupled to a selector switch, and opening a portion of a battery charging circuit in response to opening of the selector switch to prevent welding output voltage from being applied to the battery charging circuit.

In some examples, the method includes selecting, via the selector, between the welding output voltage and the battery charging output voltage, and opening at least one of the first and second contactors in response to selection of the welding output voltage.

In examples, the method includes opening at least one of the first and second contactors in response to a fault condition in either the first or the second contactor when the welding output voltage is selected. In some examples, the method includes providing the welding output voltage via a welding output receptacle, and providing the battery charging output voltage via a direct current (DC) output receptacle.

In examples, the method includes selecting, via a selector, to output the welding output voltage or the battery charging output voltage, and controlling, by a control circuit, a switched mode power supply to output the welding output voltage or the battery charging output voltage based on the selection.

In some examples, the method includes controlling at least one of the first and second coils to open in response to the control circuit controlling the switched mode power supply to output welding output voltage.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" (e.g., controller, control circuit, etc.) includes any analog and/or digital components, power and/or control elements, such as a microprocessor, digital signal processor (DSP), software, and the like, discrete and/or integrated components, or portions and/or combinations thereof.

As used herein, the terms "first" and "second" may be used to enumerate different components or elements of the same type, and do not necessarily imply any particular order.

Figure 1:
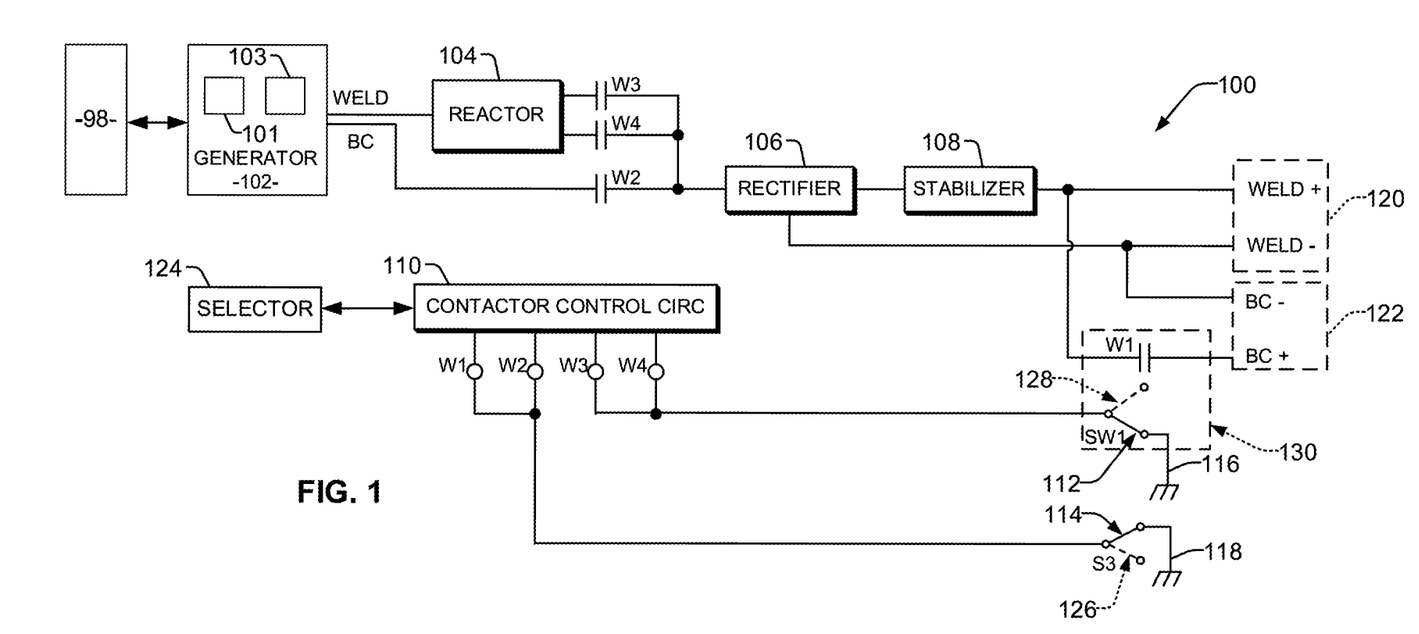
FIG. 1 illustrates an example circuit of a welding-type power supply configured to provide both weld and battery voltage, in accordance with aspects of this disclosure.

FIG. 1 is an example circuit 100 within a welding-type power supply configured to provide both weld and battery voltage. In the example of FIG. 1, a generator 102 creates a power output to a reactor 104. The reactor 104 provides power to contactors W3 and W4 associated with a first, high voltage circuit to provide a welding-type output. The generator 102 also supplies power to a contactor W2 associated with a second, low voltage circuit to provide battery-charging power. Power from each of contactors W2, W3 and W4 flow through a rectifier and a stabilizer 108 to feed a weld output 120 or a battery charging output 122 based on a selected operation. In some examples, generator 102 is powered by an engine 98. In some examples, generator 102 includes a first coil 101 (e.g., associated with a high or welding output) and a second coil 103 (e.g., associated with a low or battery charging voltage).

A contactor control circuit 110 controls operation of each of the contactors in response to an input (e.g., based on a selection from a user interface, such as selector switch 124, a signal from a programmed device such as a computer, a robotic sequencer, etc.). The example control circuit 110 of FIG. 1 may be a general-purpose computer, a laptop computer, a tablet computer, a mobile device, a server, and/or any other type of computing device integrated or remote to the power supply.

The control circuit 110 may receive input from the selector switch 124 or other user interface through which the power supply 100 receives commands from, for example, an operator (e.g., a welder). In some examples, the operator may employ the user interface to choose a welding process low welding range, high welding range, 12V battery charging, 24V battery charging, etc.) and/or desired operating values. In addition to the selector switch 124, the user interface can be configured for inputting commands and/or customizing controls (e.g., graphical user interfaces (GUI), touch screens, communication pathways, etc.). The control circuit 110 may be configured to receive and process a plurality of inputs regarding the performance and demands of the power supply.

In an example, the contactor W1 (e.g., the battery charge disconnecting device) is operatively connected to an auxiliary switch SW1 112, as represented in block 130, to open a portion of the high voltage circuit. For example, the contactor W1 controls a portion of the high voltage circuit (e.g., the ground connection 116) associated with the high voltage contactors W3 and W4. In particular, when the contactor W1 is selected, or has failed closed, as shown with dotted line 128, the high voltage contactors W3 and W4 cannot be activated because the high voltage circuit is not closed (e.g., the return/ground connection 116 is open as switch 112 is in position 128). Additionally or alternatively, the power to the contactors can be interrupted, thereby preventing the contactors to close. Thus, the function of the contactor W1 prevents high voltage from being applied to the battery charge system. The result is an electrical interlock, which, by mechanically removing a portion of the high-voltage circuit, prevents the high-voltage circuit from being completed, thereby preventing any current from flowing through the open circuit.

To further control the battery charge system, a switch S3 114 (e.g., a low current process switch) is used to control a portion of the battery charging circuit (e.g., a ground connection 118 for contactors W1, W2). When the high voltage process is selected and the switch S3 114 is in position 126, the ground 118 for contactors W1 and W2 is removed, preventing contactors W1 and W2 from activating.

When the battery charge contactor W1 is activated, or is closed due to a fault as represented by dotted line 128, the switch SW1 112 connected to contactor W1 opens the ground connection 116 to the weld contactors W3 and W4. If a signal (e.g., 12V signal sent to contactor control circuit 110) is sent to weld contactors W3 and W4, they cannot activate due to the lack of a ground on the contactor coil. This prevents high voltage from being applied to the battery output 122, preventing damage to operators or devices during a low power operation.

During a selected welding-type operation, contactors W3 and W4 provide the required amount of weld output by disconnecting and connecting to the proper tap on the weld reactor 104, Contactors W1 and W2 supply battery charge output that is low voltage, and appropriate for the battery being charged. Both the weld and battery charge systems use the same connection at the output rectifier 106.

In some examples, the selector 124 can be replaced with a three-position process select toggle switch on a panel of the power supply and/or on a remote control interface. This process select switch is light and does not require additional wires added to the interconnect cables to provide command signals to the contactor control circuit 110. The switch is set to WELD/GEN, 24V, or 12V, to select the output that is desired. When in WELD/GEN process, the ground connection 118 to the battery charge contactors W1 and W2 is removed as switch S3 114 is in position 126. This provides for a positive "OFF" for the battery charge system, using a mechanical switch, rather than relying on microprocessor control to open contactor W1. Conversely, when a 12V or 24V process is selected, contactors W1 and W2 are activated, which in turn removes the ground 116 for the welding contactors W3 and W4 when switch SW1 112 is in position 128.

Figure 2:
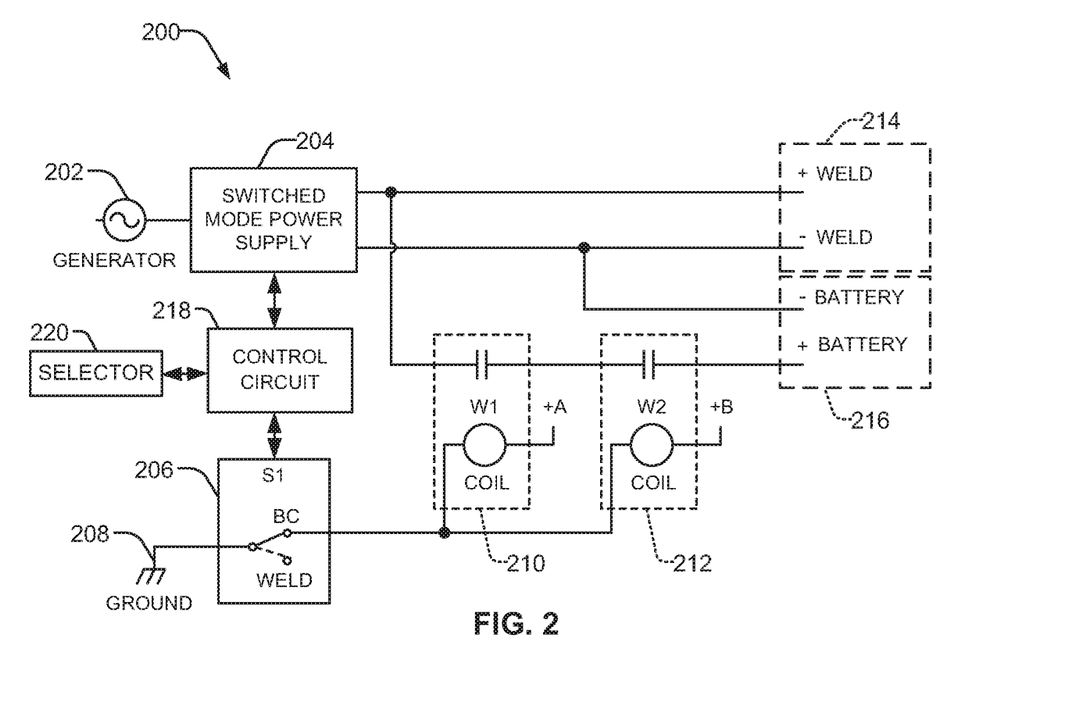
FIG. 2 illustrates another example circuit of a welding-type power supply configured to provide both weld and battery voltage, in accordance with aspects of this disclosure.

FIG. 2 illustrates another example circuit 200 incorporating an interlock, in accordance with the present disclosure. The circuit 200 includes a generator 202 to provide power to a switched mode power supply 204 (e.g., an inverter or secondary switch). The switched mode power supply 204 is configured to provide a high voltage power output to a first, welding output 214, and a low voltage battery charging output to a second, battery charging output 216.

As shown in FIG. 2, a switch S1 206 is configured to select between a battery charge mode BC and a weld mode in response to a selection from selector 220 (e.g., a user interface). In the battery charge mode, the battery charging circuit is complete, as battery contactor coils 210 and 212 are connected to ground 208. In other words, battery contactor coils 210 and 212 are associated with contactors W1 and W2, respectively. Thus, when switch 206 is in battery charging mode and ground 208 is connected, signals +A and +B (e.g., from a contactor control circuit 218) can activate the contactors W1 and W2 to engage with coils 210 and 212 to provide battery charging voltage to the battery charging output 216.

When switch 206 is set to welding mode, such that the switched mode power supply 204 provides welding-type voltage to the welding output 214, the ground 208 is open. Therefore, the battery charging circuit is incomplete, and signals +A and +B would be ineffective to activate contactors W1 and W2. Thus, even if one of the contactors W1 and W2 were to fail close, the other contactor would prevent welding voltage from being applied to the battery charging circuit.

Figure 3A:
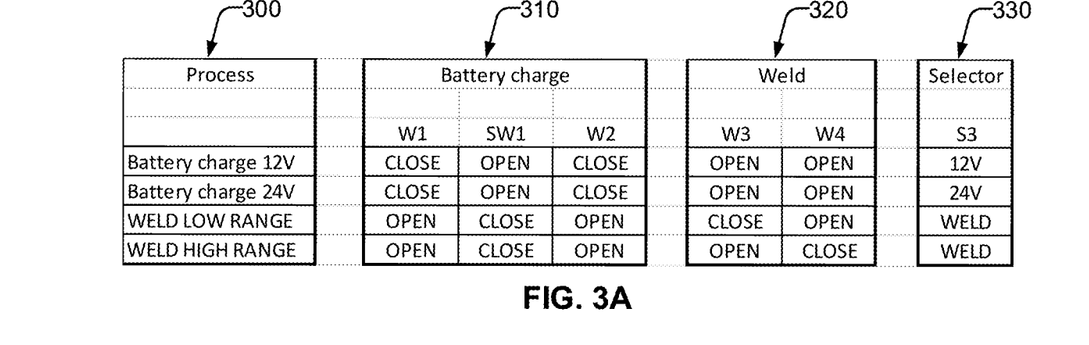
FIG. 3A is an example table demonstrating an operation of a circuit configured to provide both welding-type voltage and battery voltage, in accordance with aspects of this disclosure.

FIG. 3A shows an example table demonstrating an operation of a circuit (e.g. circuit 100) configured to provide both welding-type voltage and battery voltage. Section 300 shows four example modes, including a 12V battery-charging mode, a 24V battery-charging mode, a welding low range, and a welding high range. Section 310 shows circuit elements associated with the battery charging modes, including contactors W1 and W2, and switch SW1. Section 320 contains circuit elements associated with the welding modes, including contactors W3 and W4. Section 330 shows a selection as provided by an operator or a sequencer, as input via an interface (e.g., selector switch S3 124, etc.).

In the example of FIG. 3A, as a selection is made in section 330, the table illustrates the state of each circuit element associated with the battery-charging mode and the welding mode. In particular, in response to a selected mode, each circuit component will represent a "closed" or an "open" state, as described with respect to FIG. 1. Thus, in each of the battery charging modes, the contactors W1 and W1 associated with the battery charging circuit (e.g., for battery charging output 122) are closed, and the contactors W3 and W4 associated with the welding circuit (e.g., for welding output 120) are open. Additionally, switch SW1 is open, thereby removing a portion of the welding circuit (e.g., ground 116), preventing operation of contactors W3 and W4, even in the event of a fault.

Conversely, in each of the welding-type operations, contactors W1 and W2 are open, whereas contactor W3 is closed in the low weld range, and W4 is closed in the high weld range. Additionally, in each of the welding modes, switch SW1 is closed, completing the weld circuit and enabling operation of contactors W3 and W4.

Figure 3B:
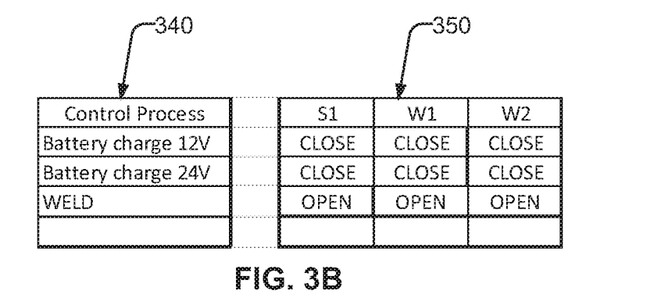
FIG. 3B is an example table demonstrating an operation of another circuit configured to provide both welding-type voltage and battery voltage, in accordance with aspects of this disclosure.

FIG. 3B shows an example table demonstrating an operation of another circuit circuit 200) configured to provide both welding-type voltage and battery voltage via a switched mode power supply (e.g., switched mode power supply 204). Section 340 shows three example modes, including a 12V battery-charging mode, a 24V battery-charging mode, and a welding mode. Section 350 shows circuit elements associated with the battery charging modes, including switch S1 (e.g., switch 206) and contactors W1 and W2 (associated with coils 210 and 212, respectively). Section 320 contains circuit elements associated with the welding modes, including contactors W3 and W4.

In the example of FIG. 3B, as a selection is made in section 340 as provided by an operator or a sequencer, as input via an interface (e.g., selector switch 220), the table illustrates the state of each circuit element associated with the battery-charging mode and the welding mode. In particular, in response to a selected mode, each circuit component will represent a "closed" or an "open" state, as described with respect to FIG. 2. Thus, in each of the battery charging modes, the switch S1 and the contactors W1 and W1 associated with the battery charging circuit (e.g., for battery charging output 216) are closed. Additionally, switch S1 is open, thereby removing a portion of the battery charging circuit (e.g., ground 208), preventing operation of contactors W1 and W2, even in the event of a fault.

Conversely, in the welding mode, contactors W1 and W2 are open. This reflects a situation where a selection for welding voltage has been made, and a control circuit (e.g., control circuit 218) moves switch S1 from a closed to an open position, thereby disabling operation of W1 and W2.

Figure 4:
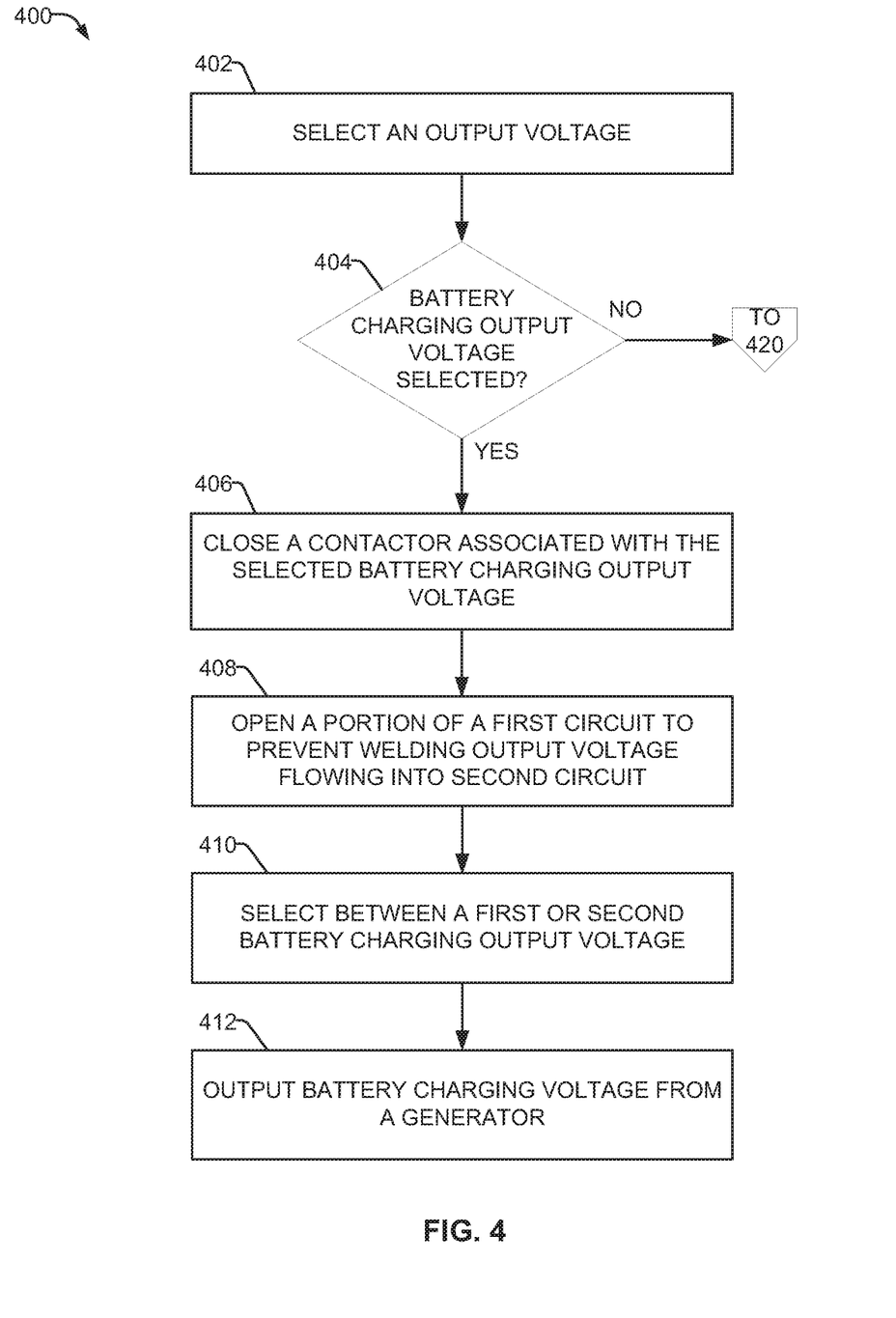
FIG. 4 illustrates an example method of providing battery charging output voltage in a welding-type system, in accordance with aspects of this disclosure.
Figure 5:
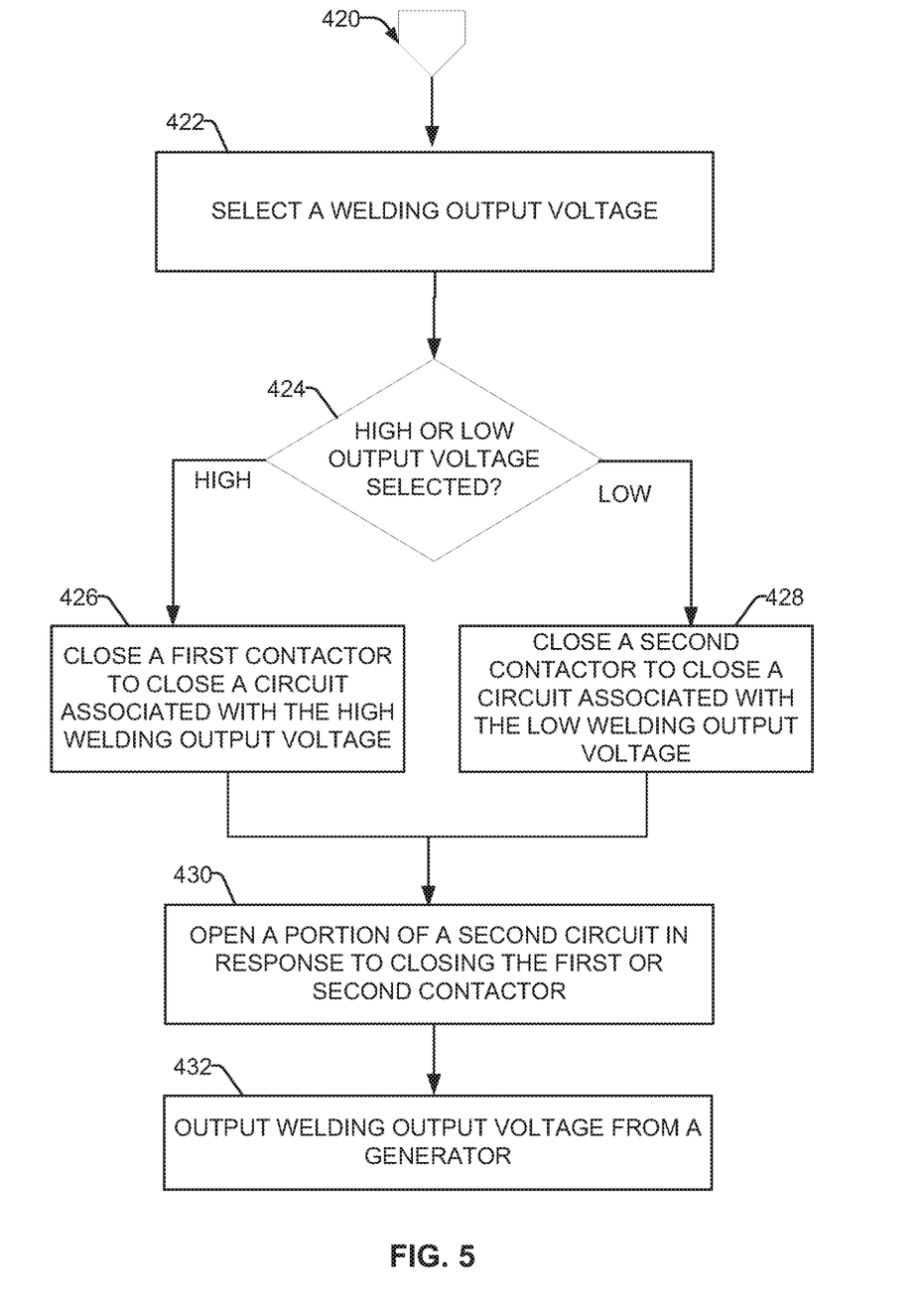
FIG. 5 illustrates an example method of providing welding output voltage in a welding-type system, in accordance with aspects of this disclosure.

FIGS. 4 and 5 represent flowcharts illustrating example methods of operating a welding-type power supply configured to supply a welding output voltage and a battery charging output voltage, in accordance with the description of FIGS. 1 through 3B. The method can be implemented by machine-readable instructions, which may be executed by a controller (e.g., the contactor control circuit 110 of FIG. 1). In examples, the instructions can be stored in a memory device, provided remotely (e.g., via cloud computing), or other suitable methods.

As illustrated in the example of FIG. 4, the method 400 provides battery charging output voltage, Method 400 begins at block 402, where using a user interface (e.g., via the selector 124), an output voltage is selected between a welding output voltage and a battery charging output voltage. For example, the welding-type power supply is configured to provide multiple voltage outputs, including, for instance, a 12V or 24V battery charging output voltage, and/or a high and low welding output voltage (see, e.g., FIG. 3A). At block 404, the selection is made between battery charging and welding. Thus, if battery charging output voltage is selected (e.g., via selector 124), the method proceeds to block 406 a contactor (e.g., contactors W1 and/or W2) associated with a second circuit is closed (e.g., battery charging circuit associated with battery charging outputs 122, 216). If battery charging output voltage is not selected, the method proceeds to block 420, as shown in FIG. 5 (e.g., for a welding output voltage selection).

At block 408, a portion (e.g., portion 116) of a first circuit (e.g., welding circuit associated with welding outputs 120, 214) is opened to prevent welding output voltage from being applied the second (battery charging) circuit. The portion of the first circuit is opened by a switch (e.g., switch SW1 112) operatively connected to the selector switch to disable current flow from the first circuit during operation of the battery charging output.

In the example of FIG. 4, block 410 selects between a first and second battery charging voltage (e.g., 12V or 24V). The selection can be made by an operator, a controller implementing instructions, in response to a feedback signal indicating the load capacity of the battery to be charged, or other suitable method of selecting the appropriate charging voltage level. At block 412, an output from a generator provides battery-charging voltage to a load (e.g., a rechargeable battery at battery charging outputs 122, 216).

FIG. 5 illustrates an example method starting block 420 (e.g., continued from FIG. 4), when battery output voltage was not selected in block 404. In block 422, a welding output voltage is selected. In block 424, a selection is made (e.g., via selector 124) between a first and second welding voltage level (e.g., a high or low voltage level). The selection can be made by an operator, a controller implementing instructions, in response to a feedback signal indicating a voltage rating of the device to be powered, or other suitable method of selecting the appropriate voltage level.

If a high welding voltage is selected, at block 426, a first welding contactor (e.g., contactor W3) associated with a welding circuit is closed (e.g., welding circuit output 120, 214). If a high welding voltage is selected, at block 428, a second welding contactor (e.g., contactor W4) associated with the welding circuit is closed. Once the first or second contactor is closed, engaging the welding output circuit, in block 430 a portion (e.g., portion 118) of the battery charging circuit (e.g., associated with battery charging output 122, 216) is opened to prevent welding output voltage from being applied the second (battery charging) circuit. The portion of the second circuit is opened by an auxiliary switch (e.g., switch S3 114) operatively connected to the contactor to disable the second circuit during operation of the welding voltage output. At block 430, an output from a generator provides welding voltage to a load (e.g., a welding-type tool).

Figure 6:
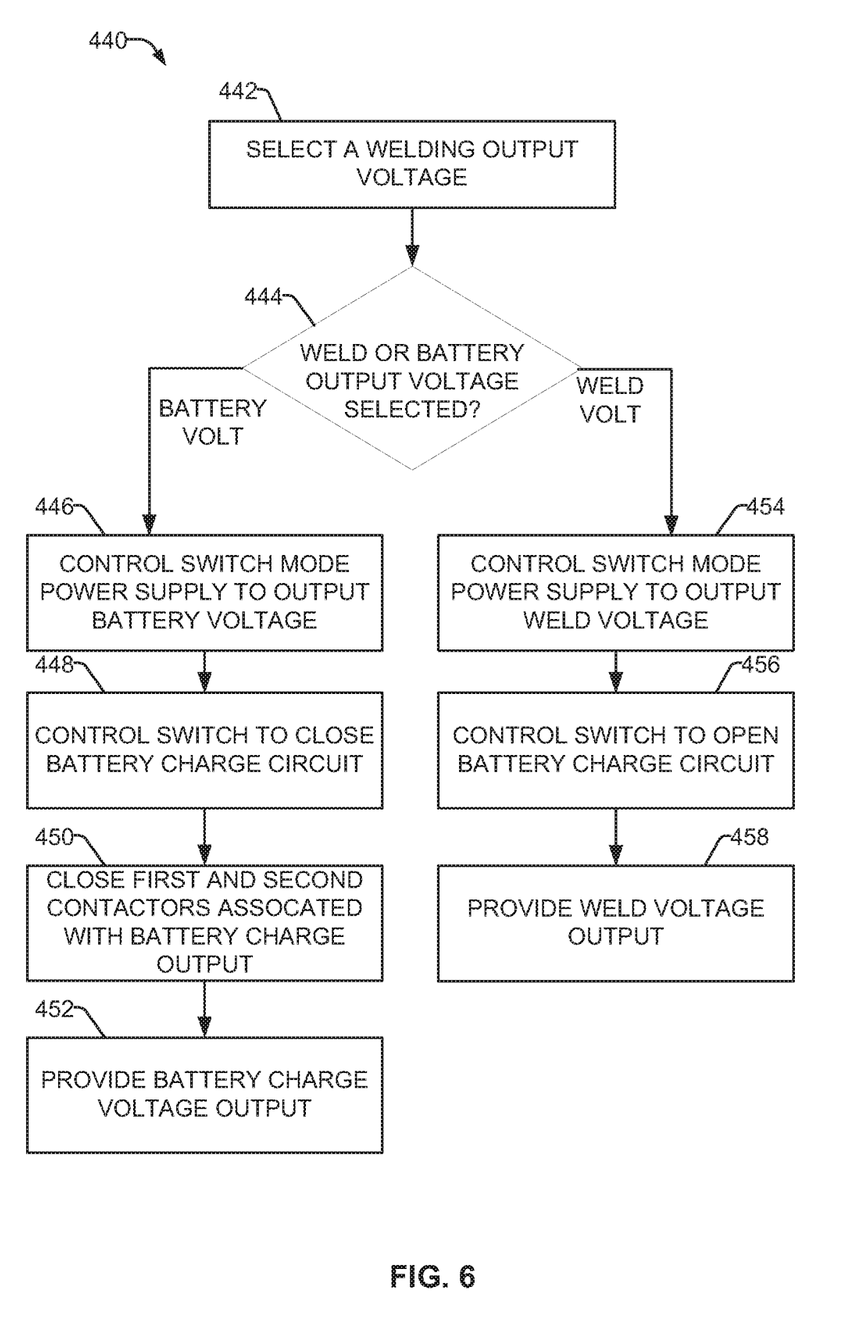
FIG. 6 illustrates an example method of providing battery output voltage and/or welding output voltage in a welding-type system by a switched mode power supply, in accordance with aspects of this disclosure.

As illustrated in the example of FIG. 6, a method 440 begins at block 442, where, using a user interface (e.g., via the selector 220), an output voltage is selected between a welding output voltage and a battery charging output voltage. For example, the welding-type power supply is configured to provide multiple voltage outputs, including, for instance, a 12V or 24V battery charging output voltage, and/or a welding output voltage (see, e.g., FIG. 3B). At block 444, the method determines whether a battery voltage output or a welding voltage output is selected. If a selection is made to provide battery charging, the method proceeds to block 446, where a control circuit (e.g., control circuit 218) controls a switched mode power supply (e.g., switched mode power supply 204) to output battery charging voltage in response to the selection.

At block 448, the control circuit controls a switch (e.g., switch S1 206) to complete a battery charging circuit based on the selection. For example, the switch closes a portion of the circuit to connect to ground (e.g., portion 208) to complete the circuit. At block 450, first and second contactors (e.g., contactors W1 and/or W2) associated with the battery charging circuit are closed and a battery charging voltage output is provided (e.g., at battery charging output 216) at block 452.

If at block 444 the selection is for welding output voltage, the method proceeds to block 454, where the control circuit controls the switched mode power supply to output welding voltage in response. At block 456, the portion of the circuit is opened by the switch (e.g., switch S1 206) to prevent current from flowing to first and second coils (e.g., coils 210 and 212) associated with the first and second contactors during operation of the welding voltage output. This prevents welding voltage from reaching the battery charging output during operation of a welding process.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply configured to supply a welding output voltage and a battery charging output voltage, the power supply comprising:
   a first contactor associated with a first circuit to provide the welding output voltage;
   a second contactor associated with a second circuit to provide the battery charging output voltage; and
   an auxiliary switch operatively coupled to the second contactor, the auxiliary switch configured to prevent the first circuit from closing when the second contactor is closed to prevent transmission of the welding output voltage to the second circuit.

2. The welding-type power supply as defined in claim 1, wherein a portion of the first circuit is configured to open when the second contactor closes in response to a fault condition to prevent welding output voltage being applied from the first circuit to the second circuit.

3. The welding-type power supply as defined in claim 1, further comprising:
   an engine; and
   a generator configured to be driven by the engine, the generator comprising a first coil and a second coil, the welding output voltage being generated via the first coil and the battery charging voltage being generated via the second coil.

4. The welding-type power supply as defined in claim 1, further comprising:
   a direct current (DC) output receptacle to provide the battery charging output voltage; and
   a welding output receptacle to provide the welding output voltage.

5. The welding-type power supply as defined in claim 4, wherein the battery charging output voltage and the welding output voltage provide power to respective receptacles via a common connection at an output rectifier.

6. The welding-type power supply as defined in claim 1, further comprising a selector configured to select between the welding output voltage and the battery charging output voltage.

7. The welding-type power supply as defined in claim 6, further comprising a control circuit to control one or more of the first contactor, the second contactor or the auxiliary switch, wherein, in response to selection of the battery charging output voltage, the control circuit is configured to control the second contactor to close and the auxiliary switch to open the first contactor thereby opening the first circuit.

8. The welding-type power supply as defined in claim 6, wherein the selector is mechanically connected to a portion of the second circuit, the portion of the second circuit to open the first circuit when the battery charging output voltage is selected.

9. A welding-type power supply configured to supply a welding output voltage and a battery charging output voltage, the power supply comprising:
   a first circuit to provide the welding output voltage;
   a second circuit to provide the battery charging output voltage;
   a first and second contactor associated with the second circuit to provide the battery charging output voltage; and
   a selector switch operatively coupled to a portion of the second circuit to prevent the second circuit from closing when the first circuit is closed to prevent transmission of the welding output voltage to the second circuit.

10. The welding-type power supply as defined in claim 9, further comprising a switched mode power supply configured to condition an output from a generator to provide the welding output voltage or the battery charging voltage based on the selection.

11. The welding-type power supply as defined in claim 9, further comprising a control circuit configured to:
   receive a signal corresponding to a selection from the selector switch; and
   control an output from the switched mode power supply based on the selection.

12. The welding-type power supply as defined in claim 9, wherein the welding output voltage is higher than the battery charging output voltage.

13. The welding-type power supply as defined in claim 9, further comprising a selector switch configured to transmit commands to the first and second contactors to close the second circuit to provide battery charging output voltage.

14. The welding-type power supply as defined in claim 13, further comprising a first battery coil and a second battery coil, wherein the first and second coils are connected to the second circuit, such that selection of the welding output voltage prevents the first battery coil or the second battery coil from closing.

15. A method of operating a welding-type power supply configured to supply a welding output voltage and a battery charging output voltage, the method comprising:
   closing a first and second contactor associated with the battery charge output voltage, the first and second contactor operatively coupled to a selector switch; and
   opening a portion of a battery charging circuit in response to opening of the selector switch to prevent welding output voltage from being applied to the battery charging circuit.

16. The method as defined in claim 15, further comprising opening at least one of the first and second contactors in response to a fault condition in either the first or second contactor when the welding output voltage is selected.

17. The method as defined in claim 15, further comprising:
   providing the welding output voltage via a welding output receptacle; and
   providing the battery charging output voltage via a direct current (DC) output receptacle.

18. The method as defined in claim 15, further comprising:
   selecting, via the selector, between the welding output voltage and the battery charging output voltage; and
   opening at least one of the first and second contactors in response to selection of the welding output voltage.

19. The method as defined in claim 18, further comprising:
   selecting, via a selector, to output the welding output voltage or the battery charging output voltage; and
   controlling, by a control circuit, a switched mode power supply to output the welding output voltage or the battery charging output voltage based on the selection.

20. The method as defined in claim 19, further comprising controlling at least one of the first and second coils to open in response to the control circuit controlling the switched mode power supply to output welding output voltage.

* * * * *